(12) United States Patent
Challener et al.

(10) Patent No.: US 8,319,751 B2
(45) Date of Patent: Nov. 27, 2012

(54) APPARATUS, METHOD, AND SYSTEM FOR TOUCH AND GESTURE DETECTION

(75) Inventors: David C. Challener, Raleigh, NC (US); Scott Edwards Kelso, Durham, NC (US); John Carl Mese, Cary, NC (US); Nathan J. Peterson, Raleigh, NC (US); Rod D. Waltermann, Rougemont, NC (US); Arnold S. Weksler, Raleigh, NC (US)

(73) Assignee: Lenovo (Singapore) Pte. Ltd., Techpark (SG)

( * ) Notice: Subject to any disclaimer, the term of this patent is extended or adjusted under 35 U.S.C. 154(b) by 557 days.

(21) Appl. No.: 12/552,968

(22) Filed: Sep. 2, 2009

(65) Prior Publication Data
US 2011/0050639 A1  Mar. 3, 2011

(51) Int. Cl.
*G06F 3/042* (2006.01)
(52) U.S. Cl. ..................... 345/175; 178/18.09
(58) Field of Classification Search ............... None
See application file for complete search history.

(56) References Cited

U.S. PATENT DOCUMENTS

| 6,333,735 | B1 | 12/2001 | Anvekar | |
|---|---|---|---|---|
| 6,961,051 | B2* | 11/2005 | Weindorf et al. | 345/175 |
| 2002/0118177 | A1* | 8/2002 | Newton | 345/173 |
| 2006/0227120 | A1* | 10/2006 | Eikman | 345/175 |
| 2008/0198144 | A1* | 8/2008 | Shimizu et al. | 345/175 |
| 2009/0189878 | A1* | 7/2009 | Goertz et al. | 345/175 |
| 2009/0322499 | A1* | 12/2009 | Pryor | 340/407.2 |

\* cited by examiner

*Primary Examiner* — Adam R Giesy
(74) *Attorney, Agent, or Firm* — Kunzler Law Group, PC (57) ABSTRACT

An apparatus, method and system are disclosed for touch and gesture detection. A light source array comprises a plurality of light sources. Each light source of the light source array transmits a light beam across a face of a display in response to being activated. A light sensor array comprises a plurality of light sensors. Each light sensor of the light sensor array detects an intensity of each light beam transmitted across the face of the display in response to being activated. A controller concurrently activates each light source of the light source array with each light sensor of the light sensor array as a source/sensor pair during a detection cycle while other light sources of the light source array and other light sensors of the light sensor array are inactive. The controller further determines a location of a pointer relative to the display from a pattern of light beam intensities for each source/sensor pair.

17 Claims, 11 Drawing Sheets

APPARATUS, METHOD, AND SYSTEM FOR TOUCH AND GESTURE DETECTION

BACKGROUND

1. Field

Embodiments of this invention relate to detecting touches and gestures and more particularly relate to detecting touches and gestures on a display screen.

2. Description of the Related Art

Electronic devices increasingly use touchscreens to receive input from a user directly on a display screen. Resistive, capacitive, acoustic, and strain gauge technologies have been used to detect a touch or gesture on the display screen. However, these technologies are often expensive to scale to larger screens.

Optical imaging techniques have also been used to detect a shadow of finger or stylus on a display screen. Unfortunately, optical imaging may lack precision and require expensive components.

SUMMARY

From the foregoing discussion, there is a need for an apparatus, method, and system that detects touches and gestures relative to a display. Beneficially, such a method, apparatus, and system would accurately and cost-effectively detect user inputs.

Embodiments of the present invention have been developed in response to the present state of the art, and in particular, in response to the problems and needs in the art that have not yet been fully solved by currently available touch and gesture detection methods. Accordingly, the embodiments of the present invention have been developed to provide an apparatus, method, and system for touch and gesture detection that overcome many or all of the above-discussed shortcomings in the art.

The apparatus for touch and gesture detection is provided with a light source array, a light sensor array, and a controller. The light source array comprises a plurality of light sources. Each light source of the light source array transmits a light beam across a face of a display when activated. The light sensor array comprises a plurality of light sensors. Each light sensor of the light sensor array detects an intensity of each light beam transmitted across the face of the display when activated.

The controller concurrently activates each light source of the light source array with each light sensor of the light sensor array as a source/sensor pair during a detection cycle while other light sources of the light source array and other light sensors of the light sensor array are inactive. The controller further determines a location of a pointer relative to the display from a pattern of light beam intensities for each source/sensor pair.

A method is presented for touch and gesture detection. The method implements the functions of the apparatus. The method includes providing a light source array, providing a light sensor array, concurrently activating each light source of the light source array with each light sensor of the light sensor array as a source/sensor pair, and determining a location of a pointer.

The method provides the light source array. The light source array comprises a plurality of light sources. Each light source of the light source array transmits a light beam across a face of a display when activated. The method further provides a light sensor array comprising a plurality of light sensors. Each light sensor of the light sensor array detects an intensity of each light beam transmitted across the face of the display when activated.

A controller concurrently activates each light source of the light source array with each light sensor of the light sensor array as a source/sensor pair during a detection cycle while other light sources of the light source array and other light sensors of the light sensor array are inactive. In addition, the controller determines a location of a pointer relative to the display from a pattern of light beam intensities for each source/sensor pair A system is also presented for touch and gesture detection. The system may be embodied in an electronic device. In particular, the system, in one embodiment, includes a display, a light source array, a light sensor array, and a controller.

The display comprises LCD pixels organized in a display grid. The light source array comprises a plurality of light sources each comprising a LCD pixel fabricated with the display. An area of each light source LCD pixel is greater than an area of each display grid LCD pixel. Each light source further comprises a first mirrored surface reflecting a light beam from the light source across a face of the display when the light source is activated.

The light sensor array comprises a plurality of light sensors. Each light sensor of the light sensor array comprises a second mirrored surface reflecting each light beam transmitted across the face of the display to the light sensor. Each light sensor further detects an intensity of each light beam reflected across the face of the display when the light sensor is activated.

The controller concurrently activates each light source of the light source array with each light sensor of the light sensor array as a source/sensor pair during a detection cycle while other light sources of the light source array and other light sensors of the light sensor array are inactive. The controller further determines a location of a pointer relative to the display from a pattern of light beam intensities for each source/sensor pair.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the embodiments as set forth hereinafter.

BRIEF DESCRIPTION OF THE DRAWINGS

A more particular description of the embodiments of the invention briefly described above will be rendered by reference to specific embodiments that are illustrated in the appended drawings. Understanding that these drawings depict only typical embodiments and are not therefore to be considered to be limiting of its scope, the invention will be described and explained with additional specificity and detail through the use of the accompanying drawings, in which.

DETAILED DESCRIPTION

Elements of various embodiments may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Elements may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of an embodiment.

Figure 1:
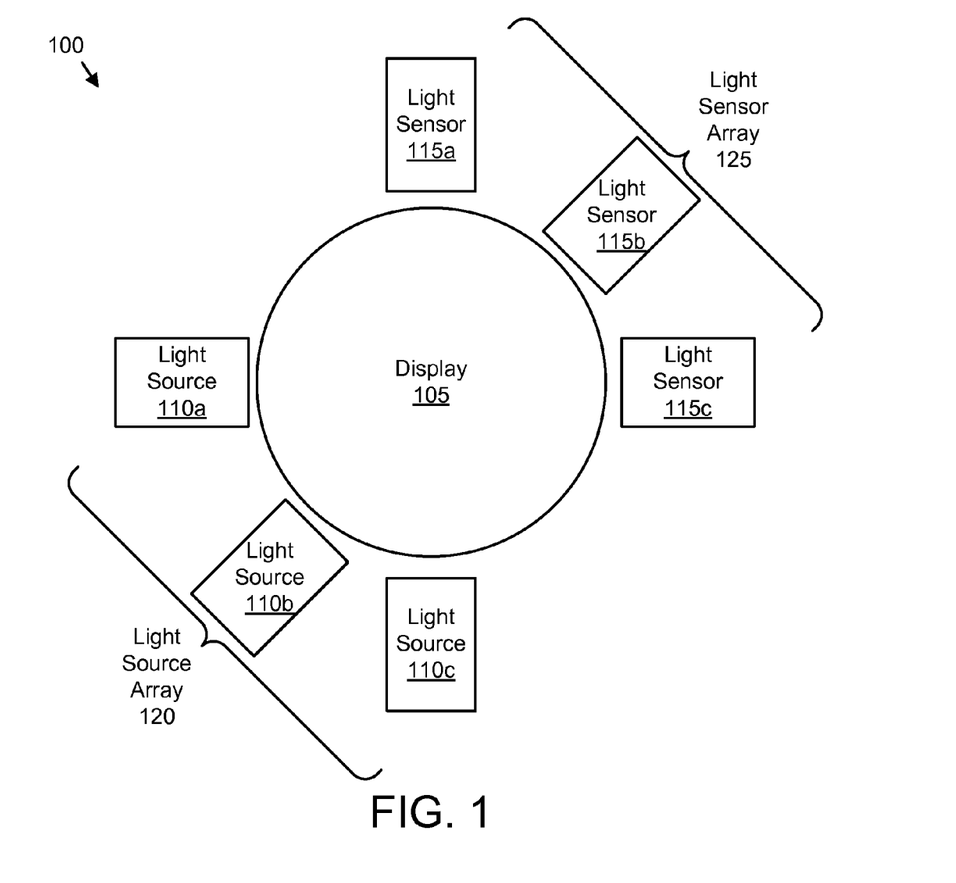
FIG. 1 is a schematic block diagram illustrating one embodiment of a display with a light source array and a light sensor array.

FIG. 1 is a schematic block diagram illustrating one embodiment of a display 105 with a light source array 120 and a light sensor array 115. The display 105, light source array 120, and light sensor array 115 may comprise a touchscreen 100 for electronic device. A user may employ a pointer such as a finger, a stylus, a mouse, or the like to make selections and input data on the touchscreen 100.

The display 105 is shown having a circular shape. One of skill in the art will recognize that the display 105 may be organized in a variety of shapes including a square, a rectangle, and free form shapes. The light source array 120 is shown with a plurality of light sources 110. Although for simplicity three light sources 110 are shown, the embodiment may be practiced with any number of light sources 110. Each light source 110 transmits a beam of light across a face of the display 105. In one embodiment, each beam of light may pass a small distance from the face of the display 105. Alternatively, each beam of light may pass through a substrate of the display 105.

The light sensor array 125 is shown with a plurality of light sensors 115. Although for simplicity three light sensors 115 are shown, the embodiment may be practiced with any number of light sensors 115. Each light sensor 115 may detect an intensity of each light beam from each of the light sources 110. The embodiments determine the location of the pointer relative to the display 105 from a pattern of light beam intensities for each pair of a light source 110 and a light sensor 115 as will be described hereafter.

Figure 2:
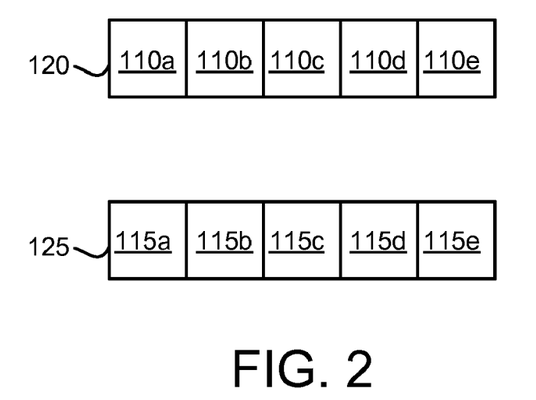
FIG. 2 is a schematic block diagram illustrating one embodiment of a light source array and a light sensor array.

FIG. 2 is a schematic block diagram illustrating one embodiment of a light source array 120 and a light sensor array 125. The light source array 120 is the light source array 120 of FIG. 1 with the light sources 110 organized in a linear array. The light sensor array 125 is a light sensor array 125 of FIG. 1 with the light sensors 115 organized in a linear array.

Figure 3:
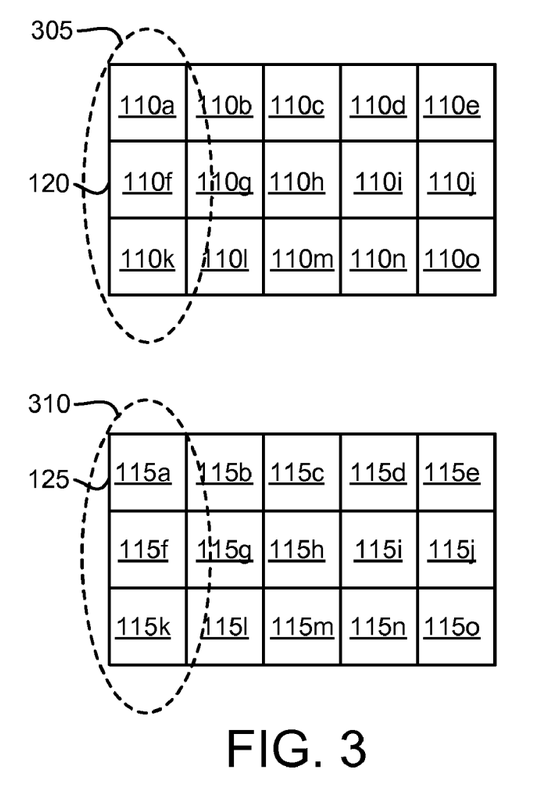
FIG. 3 is a schematic block diagram illustrating one alternate embodiment of a light source array and a light sensor array.

FIG. 3 is a schematic block diagram illustrating one alternate embodiment of a light source array 120 and a light sensor array 125. The light source array 120 is the light source array 120 of FIGS. 1-2 with the light sources 110 organized in a two-dimensional m×n array where m and n are integers. In one embodiment, m light source groups are disposed along an edge of the display 105. One example of a light source group 305 is light sources 110a, 110f, and 110k organized as a column in the light source array 120. Each light source group 305 may have n light sources 110.

The light sensor array 125 is the light sensor array 125 FIG. 1 with the light sensors 115 organized in a two-dimensional m×n array. In one embodiment, m light sensor groups are disposed along an edge of the display 105. One example of a light sensor group 310 is light sensors 115*a*, 115*f*, and 115*k* organized as a column in the light sensor array 125. Each light sensor group 310 may have n light sensors 115.

In one embodiment, organizing the light source array 120 as a two-dimensional m×n array allows the light sources 110 in each column of light sources 110 to transmit light beams at different distances from the face of the display 105. Similarly, organizing the light sensor array 125 as a two-dimensional m×n array allows the light sensors in each column of light sensors 115 to detect light beams transmitted at different distances or heights from the face of the display 105.

Figure 4:
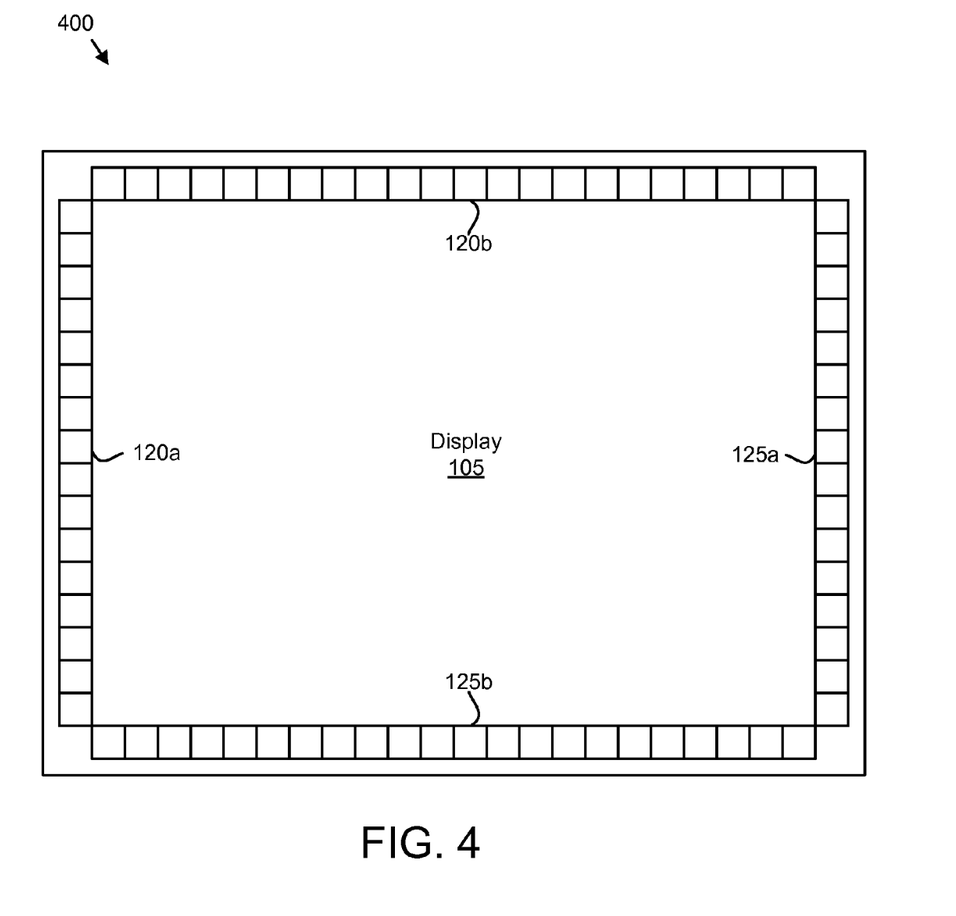
FIG. 4 is a front view drawing illustrating one embodiment of a display assembly with light source arrays and light sensor arrays.

FIG. 4 is a front view drawing illustrating one embodiment of a display assembly 400 with light source arrays 120 and light sensor arrays 125. The display assembly 400 includes the display 105, light source arrays 120, and light sensor arrays 125 of FIGS. 1-3. The light source arrays 120 and light sensor arrays 125 may be organized as linear arrays as shown in FIG. 2 or as two-dimensional m×n arrays as shown in FIG. 3.

In the depicted embodiment, a first light source array 120*a* is disposed at an edge of the display 105 opposite a first light sensor array 125*a*. The light sources 110 of the first light source array 120*a* each transmit a light beam across the face of the display 105 when the light source 110 is activated. The light sensors 115 of the first light sensor array 125*a* each detect an intensity of each light beam transmitted across the face of the display 105 when the light sensor 115 is activated.

A second light source array 120*b* is disposed at an edge of the display 105 opposite a second light sensor array 125*b*. The light sources 110 of the second light source array 120*b* each transmit a light beam across the face of the display 105 when activated. The light sensors 115 of the second light sensor array 125*b* detect an intensity of each light beam transmitted across the face of the display 105 when the light sensor 115 is activated.

When a pointer touches the display 105 or comes in close proximity to the face of the display 105, the pointer disrupts one or more light beams. As a result, the light sensors 115 of the first light sensor array 125*a* and a second light sensor array 125*b* may detect a diminished light beam intensity for some light sources 110. Embodiments determine the location for the pointer relative to display 105 from a pattern of light beam intensities for each pair of light sources 110 and light sensors 115 as will be described hereafter.

In one embodiment, the display 105 comprises LCD pixels organized the display grid. Each light source 110 of the light source arrays 120 may comprise an LCD pixel that is fabricated along with the LCD pixels of the display grid of the display 105. In one embodiment, an area of each light source LCD pixel is greater than an area of each display grid LCD pixel.

Figure 5:
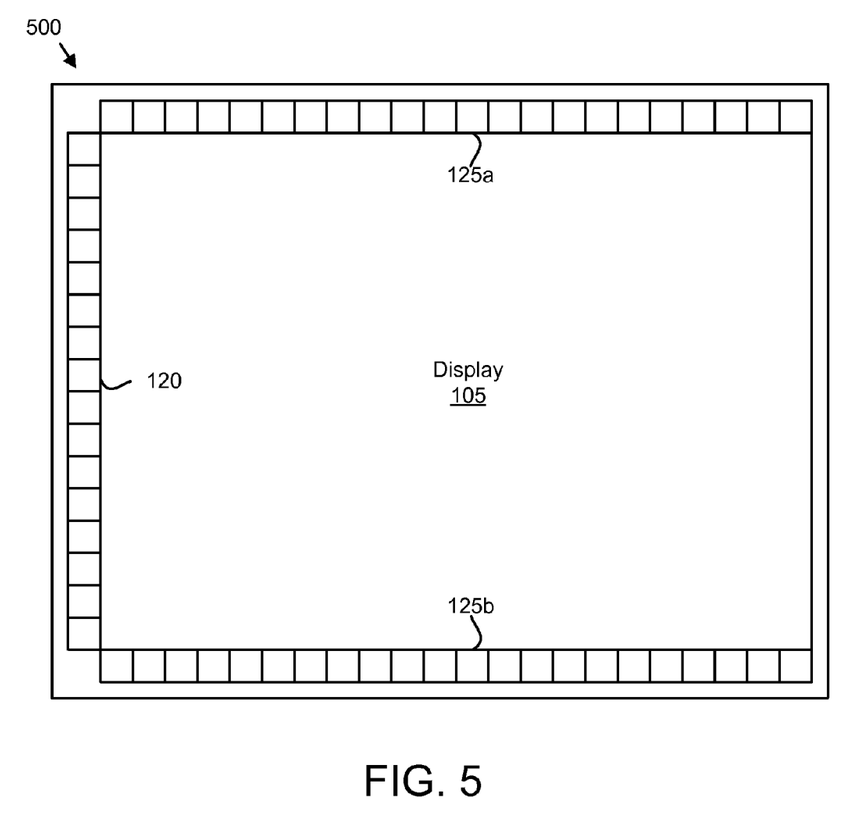
FIG. 5 is a front view drawing illustrating one alternate embodiment of a display assembly with a light source array and light sensor arrays.

FIG. 5 is a front view drawing illustrating one alternate embodiment of a display assembly 500 with a light source array 120 and light sensor arrays 125. The description of the display assembly 500 refers to elements of FIGS. 1-4, like numbers referring to like elements. The light source array 120 and light sensor arrays 125 may be organized as linear arrays as shown in FIG. 2 or as two-dimensional m×n arrays as shown in FIG. 3.

The light source array 120 is disposed along an edge of the display 105. The first light sensor array 125*a* is disposed along another edge of the display 105. The second light sensor array 125*b* is disposed along a third edge of the display 105 opposite the first light sensor array 125*a*.

In one embodiment, the light sources 110 of the light source array 120 transmit light beams across the face of the display 105. The light beams may be parallel to the first and second light sensor arrays 125*a,b*.

When the pointer touches the display 105 or comes in close proximity to the face of the display 105, the pointer disrupts one or more light beams. Light from the disrupted light beams may be scattered to the light sensors 115 of the first and second light sensor arrays 125*a,b*. The light sensors 115 detect the intensity of each scattered light beam and the present embodiment determines the location for the pointer relative to display 105 from a pattern of light beam intensities for each pair of light sources 110 and light sensors 115 as will be described hereafter.

Figure 6:
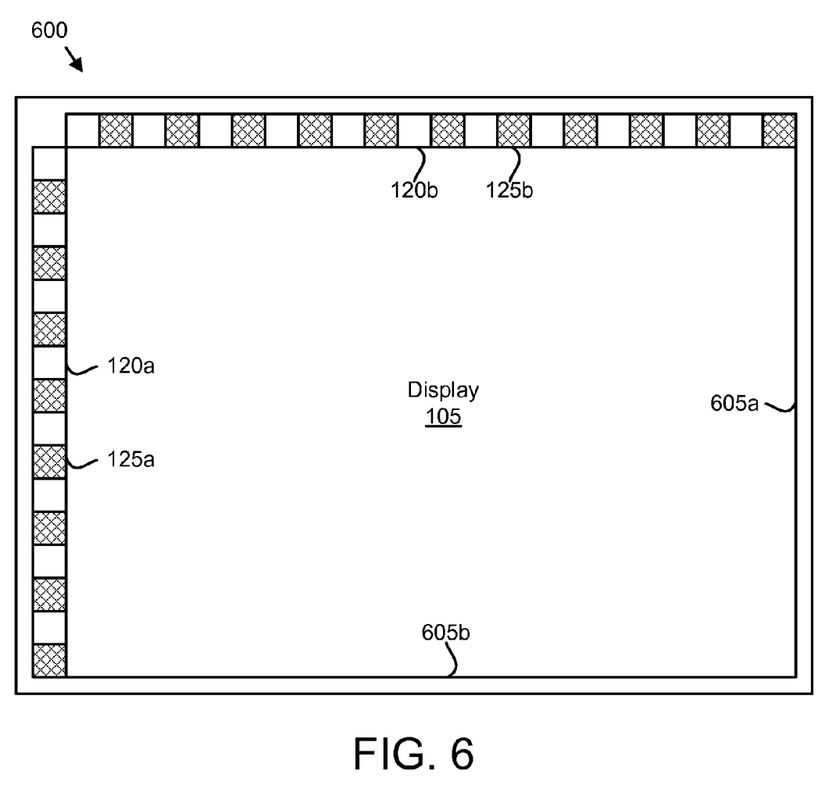
FIG. 6 is a front view drawing illustrating one embodiment of a display assembly with interleaved light source arrays and light sensor arrays.

FIG. 6 is a front view drawing illustrating one embodiment of a display assembly 600 with interleaved light source arrays 120 and light sensor arrays 125. The description of the display assembly 600 refers to elements of FIGS. 1-5, like numbers referring to like elements. The light source arrays 120 and light sensor arrays 125 may be organized as linear arrays as shown in FIG. 2 or as two-dimensional m×n arrays as shown in FIG. 3.

The light sensors 115 of a first light sensor array 125*a* are interleaved with the light sources 110 of the first light source array 120*a*. The light sensors 115 of the second light sensor array 125*b* are interleaved with the light sources 110 of the second light source array 120*a*. The depicted display assembly 600 includes a first mirror 605*a* and a second mirror 605*b*. The first mirror 605*a* is disposed across the face of the display 105 opposite the first light source array 120*a* and second light sensor array 125*a*. The second mirror 605*b* is disposed across the face of the display 105 opposite the second light source array 120*b* and second light sensor array 125*b*.

The light sources 110 of the first light source array 120*a* each transmit a light beam to the first mirror 605*a*. Each light beam is reflected from the first mirror 605*a* to the light sensors 115 of the first light sensor array 125*a*. Similarly, the light sources 110 of the second light source array 120*b* each transmit a light beam to the second mirror 605*b*. Each light beam is then reflected from the second mirror 605*b* to the light sensors 115 of the second light sensor array 125*b*.

When the pointer touches the display 105 or comes in close proximity to the face of the display 105, the pointer disrupts one or more light beams. Light from the disrupted light beams may be scattered to the light sensors 115 of the first and second light sensor arrays 125*a,b*. The light sensors 115 detect the intensity of each reflected light beam and the present embodiment determines the location of the pointer relative to display 105 from a pattern of light beam intensities for each pair of light sources 110 and light sensors 115 as will be described hereafter.

Figure 7:
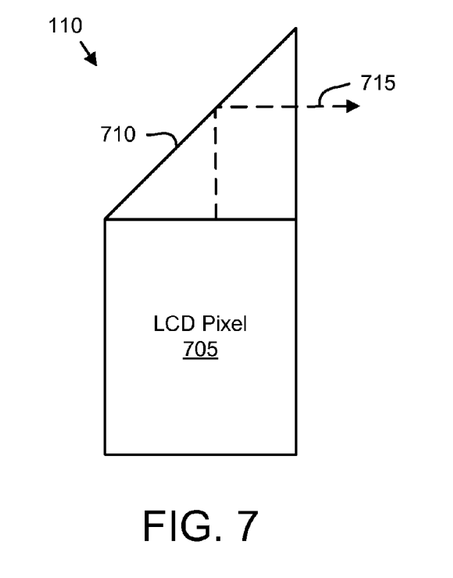
FIG. 7 is a side view drawing illustrating one embodiment of a light source.

FIG. 7 is a side view drawing illustrating one embodiment of a light source 110. The light source 110 may be the light source 110 of FIGS. 1-3. In one embodiment, the light source 110 is a cross section of the light source array 120 of FIG. 2. The description of the light source 110 refers to elements of FIGS. 1-6, like numbers referring to like elements.

In the depicted embodiment, the light source 110 includes a LCD pixel 705. However, one of skill in art will recognize that the embodiments may be practiced with other controllable light sources such as light emitting diodes (LED), organic light emitting diodes (OLED), plasma display elements, electroluminescent elements, surface conduction electron emitter elements, and field emission elements.

In one embodiment, the LCD pixel 705 comprises polarizing filters separating crystal molecules. Applying or removing an electrical field between the polarizing filters changes the polarity of the crystal molecule, blocking light or allowing light to pass between the polarizing filters as is well known to those of skill in the art. The LCD pixel 705 may employ passive matrix technology. Alternatively, the LCD pixel 705 may employ an active matrix technology such as twisted nematics, in-plane switching, advanced fringe Field switching, vertical alignment, or blue phase mode.

In one embodiment, the light source 110 further includes a mirrored surface 710. In a certain embodiment, the mirrored surface 710 is formed of a molded acrylic. A reflective material may be deposited on a face of the molded acrylic to form the mirrored surface 710. The mirror 710 reflects a light beam 715 from the LCD pixel 705 toward a light sensor array 125 such as the first light sensor array 125a or the second light sensor array 125b of FIGS. 4-5 or a mirror 605 such as the first mirror 605a or the second mirror 605b of FIG. 6.

Figure 8:
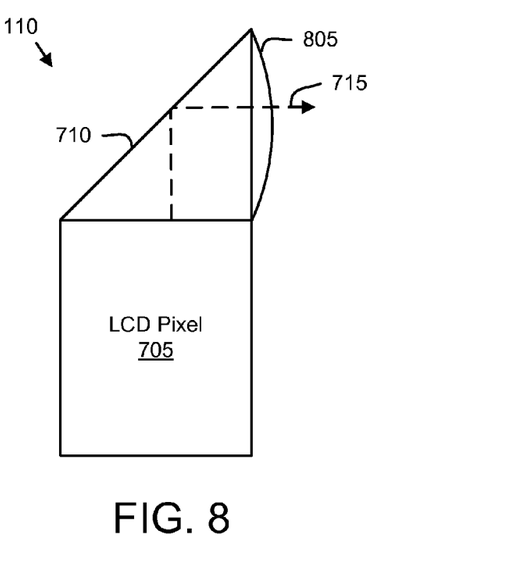
FIG. 8 is a side view drawing illustrating one embodiment of a light source with lens.

FIG. 8 is a side view drawing illustrating one embodiment of a light source 110 with a lens 805. In one embodiment, the light source 110 is shown as a cross section of the light source array 120 of FIG. 2. In the depicted embodiment, the lens 805 focuses a light beam 715 from the LCD pixel 705 of the light source 110 of FIG. 7.

In one embodiment, the lens 805 is molded as part of the mirrored surface 710. Alternatively, the lens 805 is formed separately and attached to the mirrored surface 710. The lens 805 may be formed of a molded acrylic. In one embodiment, the lens 805 is a Fresnel lens as is well known to those skilled in the art.

The lens 805 may focus the light beam 715 from the LCD pixel 705 toward a light sensor array 125 such as the first light sensor array 125a or the second light sensor array 125b of FIGS. 4-5. Alternatively, the lens 805 may focus the light beam 715 from the LCD pixel 705 toward a mirror 605 such as the first mirror 605a or the second mirror 605b of FIG. 6.

Figure 9:
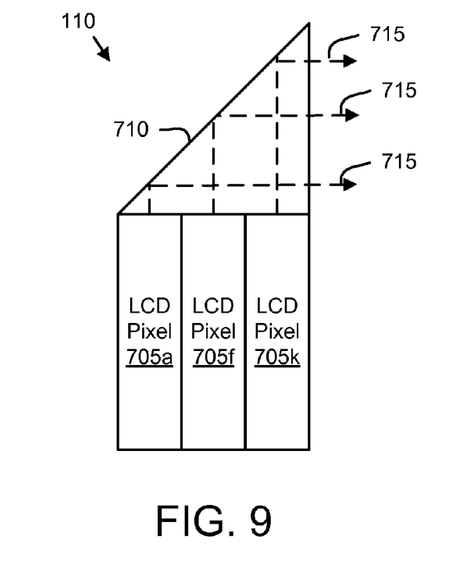
FIG. 9 is a side view drawing illustrating one embodiment of multiple light sources.

FIG. 9 is a side view drawing illustrating one embodiment of multiple light sources 110. The multiple light sources 110 may be light sources 110 of FIG. 3 arranged in a two-dimensional m×n matrix. In one embodiment, the light source 110 is shown as a cross section of the light source array 120 of FIG. 3. The description of the multiple light sources 110 refers to elements of FIGS. 1-8, like numbers referring to like elements.

In one embodiment, a column of light sources 110, such as light sources 110a, 110f, and 110k from the two-dimensional m×n matrix of FIG. 3, are formed by n LCD pixels 705, such as LCD pixel 705a, LCD pixel 705f, and LCD pixel 705k. Each LCD pixel 705 generates a light beam 715 that is reflected from the mirrored surface 710 and directed across the face of the display 105.

Figure 10:
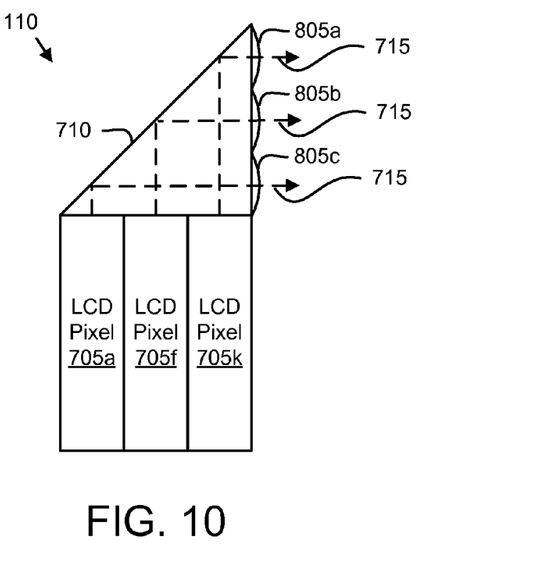
FIG. 10 is a side view drawing illustrating one embodiment of multiple light sources with lens.

FIG. 10 is a side view drawing illustrating one embodiment of multiple light sources 110 with lens 805. A plurality of lenses 805 are depicted formed on the mirrored surface 710. Each lens 805 focuses a light beam 715 from an LCD pixel 705. In one embodiment each lens 805 focuses the light beam 715 toward a light sensor array 125 such as the first light sensor array 125a or the second light sensor array 125b of FIGS. 4-5. Alternatively, the lens 805 may focus the light beam 715 from the LCD pixel 705 toward a mirror 605 such as the first mirror 605a or the second mirror 605b of FIG. 6.

Figure 11:
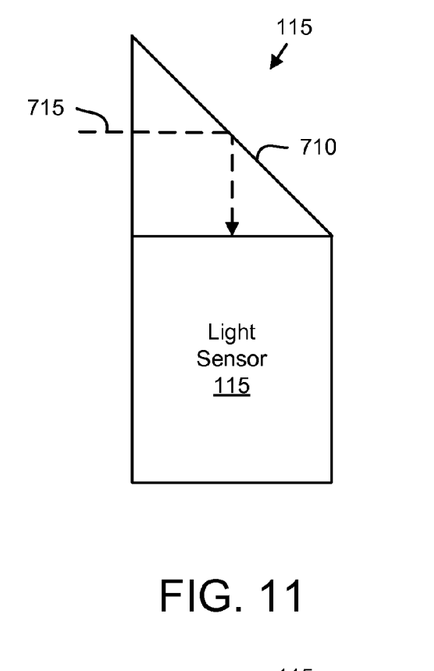
FIG. 11 is a side view drawing illustrating one embodiment of a light sensor.

FIG. 11 is a side view drawing illustrating one embodiment of a light sensor 115. The light sensor 115 may be the light sensor 115 of FIGS. 1-3. In one embodiment, the depicted light sensor 115 is a cross section of the light sensor array 125 of FIG. 2. The description of the light sensor 115 refers to elements of FIGS. 1-10, like numbers referring to like elements.

In one embodiment, the light sensor 115 is a phototransistor. In an alternate embodiment, the light sensor 115 is a photo diode. In a certain embodiment, the elements of the light sensor 115 are formed along with the display grid pixels of the display 105.

A mirrored surface 710 may reflect light traveling across the face of the display 105 into the light sensor 115. The mirrored surface 710 may be formed of a molded acrylic with a reflective coating applied to a surface of the mirrored surface 710.

Figure 12:
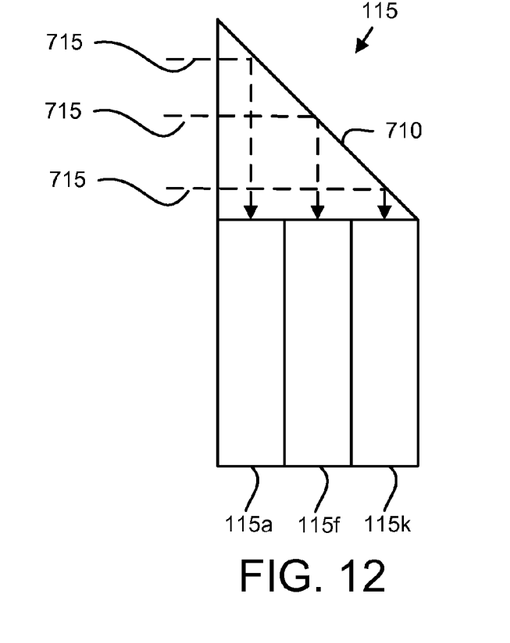
FIG. 12 is a side view drawing illustrating one embodiment of multiple light sensors.

FIG. 12 is a side view drawing illustrating one embodiment of multiple light sensors 115. The multiple light sensors 115 may be light sensors 115 of FIG. 3 arranged in a two-dimensional m×n matrix. In one embodiment, the multiple light sensors 115 are shown as a cross section of the light sensor array 125 of FIG. 3. The description of the multiple light sensors 115 refers to elements of FIGS. 1-11, like numbers referring to like elements.

In one embodiment, a column of light sensors 115 are formed by n light sensors 115, such as light sensor 115a, light sensor 115f, and light sensor 115k of FIG. 3. Each light sensor 115 receives a beam of light that is reflected from the mirrored surface 710.

Figure 13:
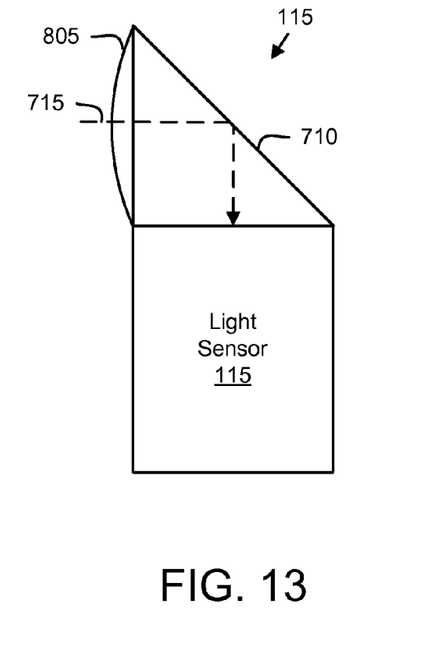
FIG. 13 is a side view drawing illustrating one embodiment of a light sensor with lens.

FIG. 13 is a side view drawing illustrating one embodiment of a light sensor 115 with lens 805. The light sensor 115 may be the light sensor 115 of FIG. 11. In one embodiment, the light sensor 115 is a cross-section of the light sensor array 125 FIG. 3. The description of the light sensor 115 refers to elements of FIGS. 1-12, like numbers referring to like elements.

A lens 805 is shown disposed on the mirrored surface 710. The lens 805 may be formed of a molded acrylic with the mirrored surface 710. The lens 805 may focus a light beam 715 received from a light source 110 onto the light sensor 115. In one embodiment the lens 805 is a Fresnel lens.

Figure 14:
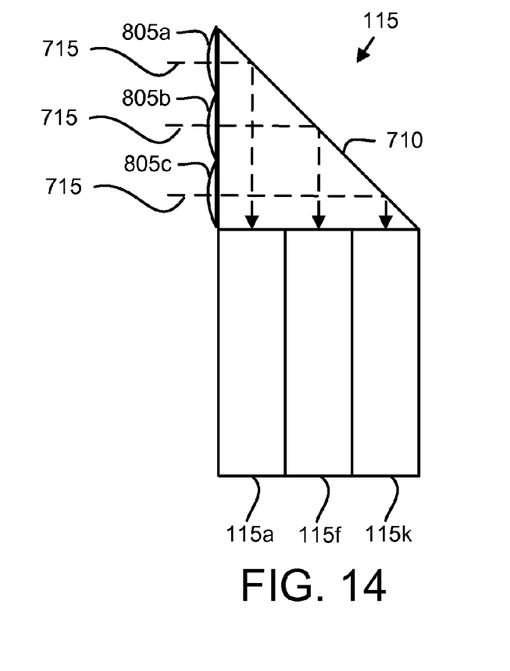
FIG. 14 is a side view drawing illustrating one embodiment of multiple light sensors with lenses.

FIG. 14 is a side view drawing illustrating one embodiment of multiple light sensors 115 with lenses 805. The multiple light sensors 115 of FIG. 13 are shown with multiple lenses 805. Each lens 805 focuses light onto one of the light sensors 115.

Figure 15:
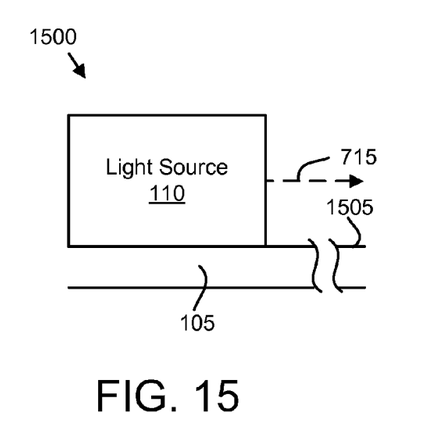
FIG. 15 is a side view drawing illustrating one embodiment of a light source disposed on a display.

FIG. 15 is a side view drawing 1500 illustrating one embodiment of a light source 110 disposed on a display 105. The light source 110 may be a light source 110 of FIGS. 1-3. The description of the light source 110 refers to elements of FIGS. 1-14, like numbers referring to like elements.

The light source 110 is shown disposed to transmit a beam of light directly across the face 1505 of the display 105. In an alternate embodiment, the light source 110 may transmit a beam of light directly through a substrate of the display 105. The light source 110 may be a LCD, LED, OLED, plasma display element, electroluminescent element, surface conduction electron emitter element, or field emission element.

Figure 16:
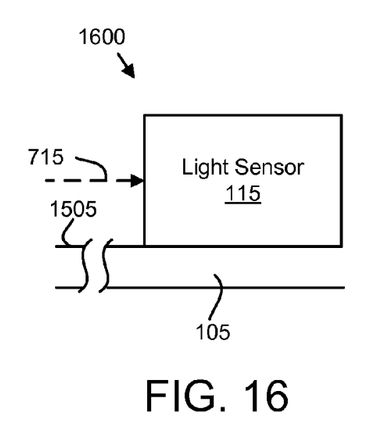
FIG. 16 is a side view drawing illustrating one embodiment of a light sensor disposed on a display.

FIG. 16 is a side view drawing 1600 illustrating one embodiment of a light sensor 115 disposed on a display 105. The light sensor 115 may be a light sensor 115 of FIGS. 1-3. Description of the light sensor 115 refers to elements of FIGS. 1-14, like numbers referring to like elements.

The light sensor 115 is shown disposed to receive a light beam 715 transmitted from a light source 110 across the face 1505 of the display 105. Alternatively, the light sensor 115 may receive light being transmitted through a substrate of the display 105. The light sensor 115 may be a phototransistor, a photo diode, or the like.

Figure 17:
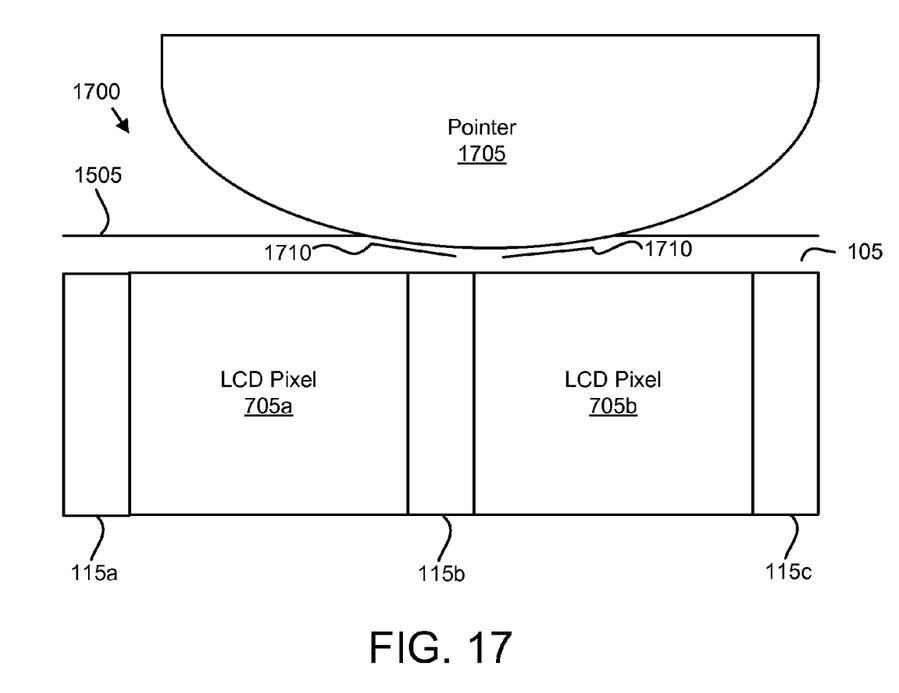
FIG. 17 is a schematic drawing illustrating one embodiment of a pointer touching a display with interleaved LCD pixels and light sensors.

FIG. 17 is a schematic drawing illustrating one embodiment of a pointer 1705 touching a display 105 with interleaved LCD pixels 705 and light sensors 115. The pointer 1705 is detected from back scattered light/interference patterns 1710. The description of the pointer 1705 touching the display 105 refers to elements of FIGS. 1-16, like numbers referring to like elements.

The depicted embodiment may be a cross-section of a display assembly 400, 500, 600. A plurality of light sensors 115 are interleaved among a plurality of LCD pixels 705 that are both light sources 110 and display grid pixels. In one embodiment, one light sensor 115 is interleaved between two LCD pixels 705. Alternatively, a plurality of LCD pixels 705 may be interleaved between each light sensor 115. When the pointer 1705 touches the display face 1505 of the display 105, the pointer 1705 deforms the display face 1505. Light from the LCD pixels 705 is back scattered 1710. One or more light sensors 115 may detect the back scattered light/interference patterns 1710. Embodiments may determine the location of the pointer 1705 from the intensities of the back scattered light/interference patterns 1710 detected by the light sensors 115.

Figure 18:
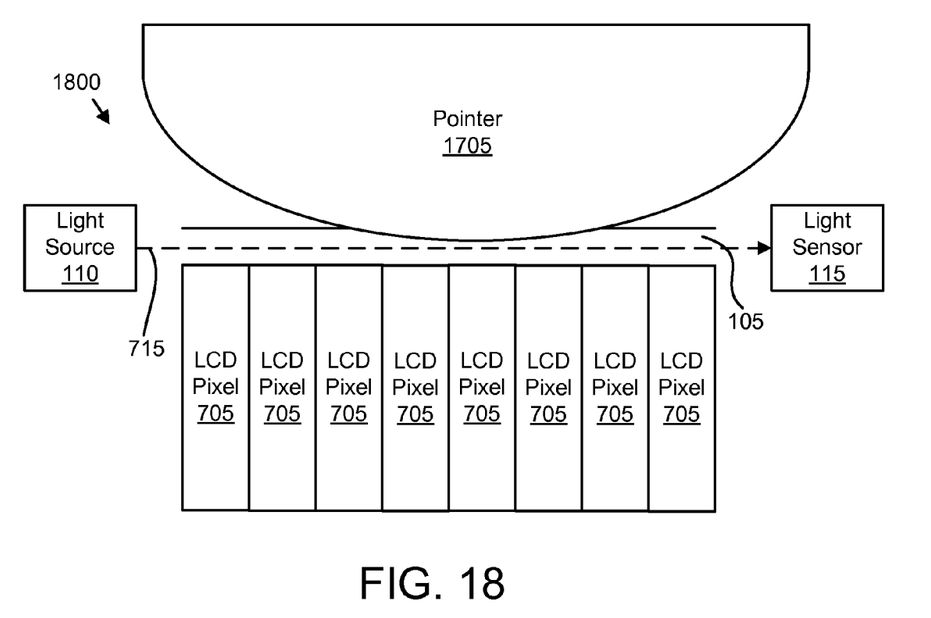
FIG. 18 is a schematic drawing illustrating one embodiment of a pointer touching a display and disrupting a light beam transmitted through the display.

FIG. 18 is a schematic drawing illustrating one embodiment of a pointer 1705 touching a display 105 and disrupting a light beam 715 transmitted through the display 105. The pointer 1705 is detected from the disruption of the light beam 715. The description of the pointer 1705 touching the display 105 refers to elements of FIGS. 1-17, like numbers referring to like elements.

The depicted embodiment may be a cross-section of the display assembly 400, 500, 600. A light source 110 in a light source array 120 transmits a light beam 715 through the display 105. In one embodiment, the light source 110 transmits the light beam 715 through a substrate such as a glass plane of the display 105. A light sensor 115 in a light sensor array 125 receives the light beam 715. When the pointer 1705 touches the display 105, the display 105 is deformed, interrupting the light beam 715. The light sensor 115 detects the intensity of the light beam 715. The embodiment may determine the location of the pointer 1705 from the intensities of the light beams 715 detected by the light sensors 115.

Figure 19:
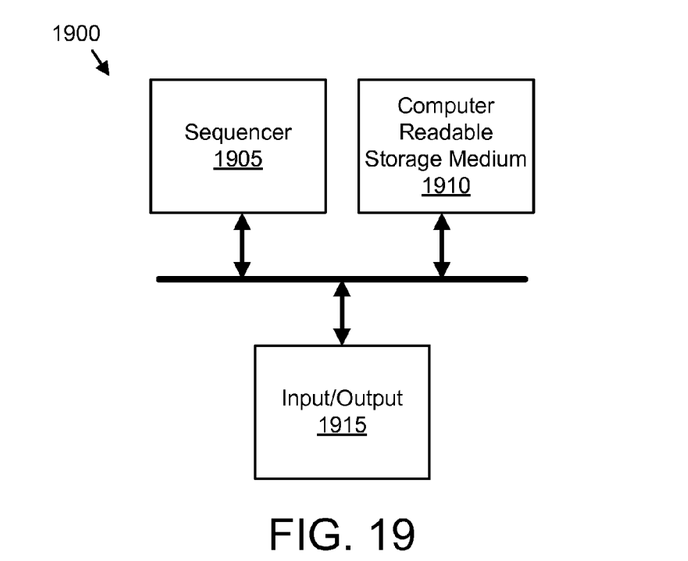
FIG. 19 is a schematic block diagram illustrating one embodiment of a controller.

FIG. 19 is a schematic block diagram illustrating one embodiment of a controller 1900. The controller 1900 may be embodied in a display assembly 400, 500, 600. The controller 1900 includes a sequencer 1905, a computer readable storage medium 1910, and an input/output 1915. The sequencer 1905, computer readable storage medium 1910, and input/output 1915 may be fabricated of semiconductor gates as is well known to those of skill in the art. In one embodiment, the sequencer 1905, computer readable storage medium 1910, and input/output 1915 may be fabricated along with the display grid pixels of the display 105.

In one embodiment, the computer readable storage medium 1910 stores a computer readable program. The sequencer 1905 may execute the computer readable program. The sequencer 1905 may control the light sources 110 in the light sensors 115 using the input/output 1915 in response to the computer readable program. In one embodiment, the sequencer 1905 directs the input/output 1915 to deactivate all light sources 110 except for a single light source 110. Similarly, the sequencer 1905 may direct the input/output 1915 to deactivate all light sensors 115 except for a single light sensor 115. The sequencer 1905 may activate each light source 110 and each light sensor 115 as a source/sensor pair during a detection cycle while other light sources 110 and other light sensors 115 are inactive. In one embodiment, each detection cycle ends when every possible source/sensor pair has been concurrently activated while other light sources 110 and other light sensors 115 are inactive. In a certain embodiment, the controller 1900 begins a subsequent detection cycle each time a current detection cycle terminates.

In one embodiment the computer readable program executed on the sequencer 1905 determines the location of the pointer 1705 relative to the display 105. The computer readable storage medium 1910 may store a light intensity from each source/sensor pair during each detection cycle. The stored light intensities may be organized as a multidimensional array of data. The computer readable program executed on the sequencer 1905 may determine the location of the pointer 1705 from the multidimensional array of data.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 20:
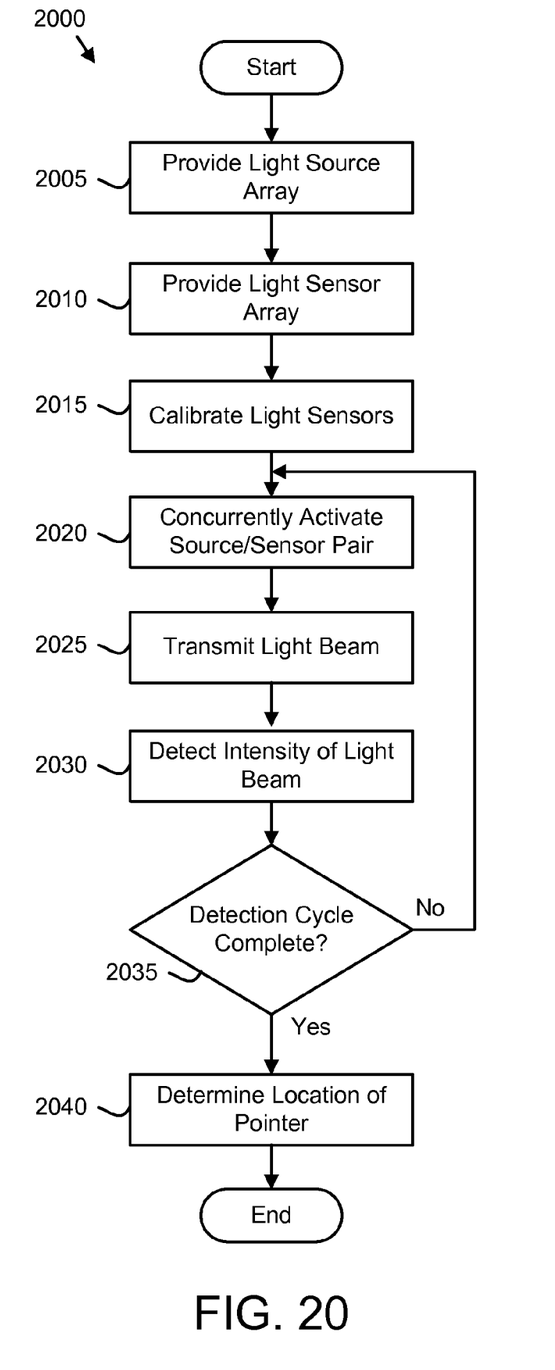
FIG. 20 is a schematic flow chart diagram illustrating one embodiment of a touch and gesture detection method.

FIG. 20 is a schematic flow chart diagram illustrating one embodiment of a touch and gesture detection method 200. The method 2000 substantially includes the steps to carry out the functions presented above with respect to the operation of the described apparatus and system of FIGS. 1-19. In one embodiment, portions of the method 2000 are implemented by the computer readable storage medium 1910 storing the computer readable program executed by the sequencer 1905. The description of the method 2000 refers to elements of FIGS. 1-19, like numbers referring to like elements.

The method 2000 provides 2005 at least one light source array 120. Each light source array 120 comprises a plurality of light sources 110. Each light source 110 of the light source array 120 transmits a light beam 715 across the face 1505 of the display 105 when activated.

The method 2000 further provides 2010 at least one light sensor array 125 comprising a plurality of light sensors 115. Each light sensor 115 of the light sensor array 125 detects an intensity of each light beam 715 transmitted across the face 1505 of the display 105 when the light sensor 115 activated.

In one embodiment, the controller 1900 calibrates 2015 each light sensor 115. In a certain embodiment, the controller 1900 records a detected light intensity for each light sensor 115 when no light source 110 is activated. The controller 1900 may store each detected light intensity in the computer readable storage medium 1910 as a base value for the light sensor 115. In one embodiment, the controller 1900 calculates a normalization factor for each light sensor 115.

In one embodiment, the controller 1900 calibrates 2015 each source/sensor pair by activating each source/sensor pair and storing an intensity value for the source/sensor pair as an expected value for the source/sensor pair. The expected values may be stored in the computer readable storage medium 1910.

The controller 1900 concurrently activates 2020 each light source 110 of the light source array 120 with each light sensor 115 of the light sensor array 125 as a source/sensor pair during a detection cycle while other light sources 110 of the light source array 120 and other light sensors 115 of the light sensor array 125 are inactive. Thus only a single light source 110 and a single light sensor 120 are active at any specified time.

In one embodiment, the controller 1900 activates a first light sensor 115a and then sequentially activates and deactivates each of the light sources 110 in turn before deactivating the first light sensor 115a. In an alternate embodiment, the controller 1900 activates a first light source 110a and then sequentially activates and then deactivates each of the light sensors 115 in turn before deactivating the first light source 110a.

In a certain embodiment, the controller 1900 initially activates source/sensor pairs that during a previous detection cycle showed evidence of a touch or gesture by the pointer 1705. Alternatively, the controller 1900 may activate source/sensor pairs in an anticipated direction of a gesture. For example, if the user is moving the pointer 1705 in a predictable direction across the display 105, the controller 1900 may predict the direction of the gesture and initially activates source/sensor pairs associated with the anticipated direction to detect the gesture.

The activated light source 110 transmits 2025 a light beam 715 across the face 1505 of the display 105. In one embodiment, the activated light source 110 directs the light beam 715 towards a specific light sensor 115 that may not be the activated light sensor 115. In an alternate embodiment, the activated light source 110 directs the light beam 715 towards a plurality of light sensors 115.

In addition, the activated light sensor 115 detects 2030 the intensity of the light beam 715. The controller 1900 may store a data value for the intensity in the computer readable storage medium 1910. In a certain embodiment, the controller 1900 multiplies the data value for the intensity by the normalization factor for the light sensor 115 and then stores the product in the computer readable storage medium 1910.

In one embodiment, the controller 1900 determines 2035 if the detection cycle is complete. The detection cycle may be complete when each source/sensor pair is activated. If the controller 1900 determines 2035 that the detection cycle is not complete, the controller 1900 concurrently activates 2020 another source/sensor pair while other light sources 110 of the light source array 120 and other light sensors 115 of the light sensor array 125 are inactivated.

The controller 1900 determines 2040 a location of a pointer 1705 relative to the display 105 from a pattern of light beam intensities for each source/sensor pair. In one embodiment, the controller 1900 compares the light beam intensity data value stored in the computer readable storage medium 1910 for each source/sensor pair with the expected value for the source/sensor pair. If the light beam intensity value is less than the expected value, the controller 1900 may flag the source/sensor pair has obstructed. In addition, the controller 1900 may determine a height of the pointer 1705 relative to the display 105 from light beam intensity value for source/sensor pairs with vectors that are a different height relative to the display 105.

In an alternate embodiment, the computer readable storage medium 1910 may store of temporal series of light beam intensity values, representing the light beam intensity values for a plurality of detection cycles. The controller 1900 may detect a change in the temporal series of light beam intensity values and flag the source/sensor pair as obstructed after a change in the light beam intensity values from high to low is detected. The controller 1900 will only flag the sensor/source pair as unobstructed after a subsequent change in the light beam intensity values from low to high is detected.

In one embodiment, the computer readable storage medium 1910 stores a vector for each source/sensor pair. The controller 1900 may determine 2040 the location of the pointer 1705 as the intersection of a specified number of obstructed source/sensor pair of vectors. For example, the controller 1900 may determine that a point in space relative to the display 105 is occupied by the pointer 1705 is at least seven source/sensor pairs that pass within 0.3 millimeters of the point are flagged as obstructed.

In one embodiment, each light sensor 115 is a camera and the controller 1900 calculates a stereo image of the pointer 1750. The controller may further determine 240 the location of the pointer 1705 from the stereo image.

Figure 21:
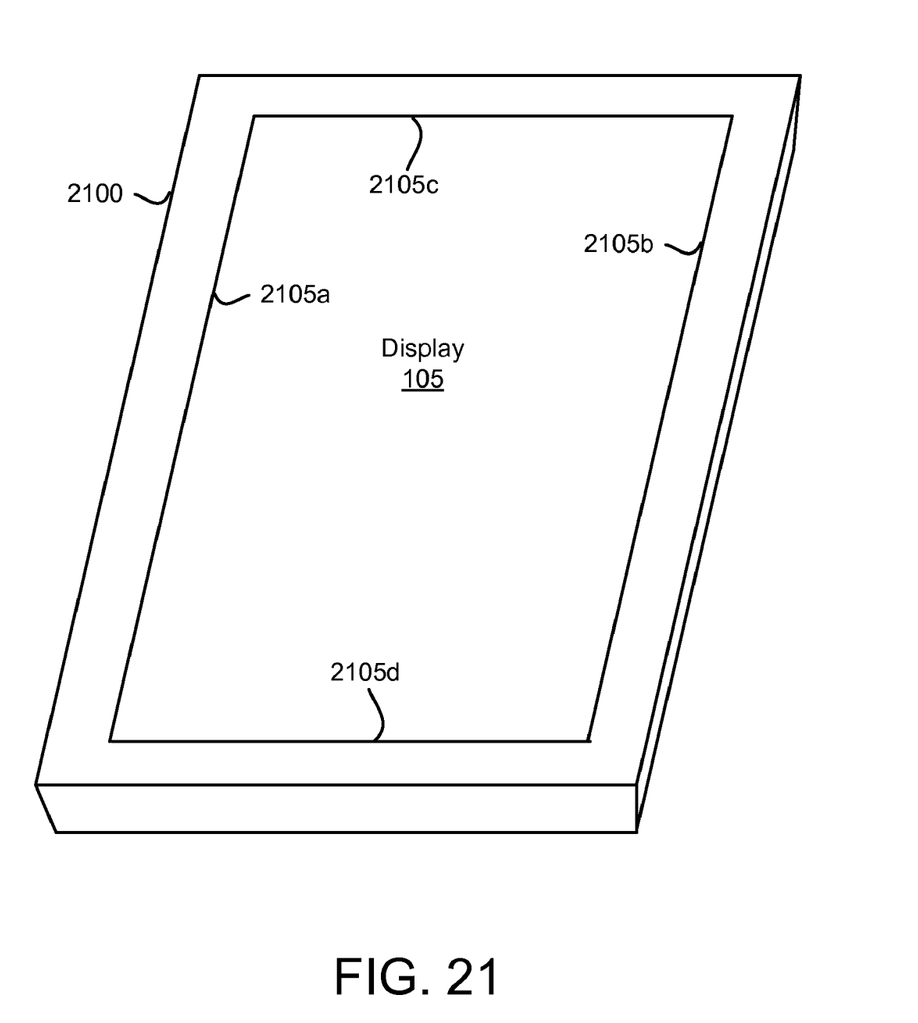
FIG. 21 is a perspective drawing illustrating one embodiment of the electronic device.

FIG. 21 is a perspective drawing illustrating one embodiment of the electronic device 2100. The electronic device 2100 includes the display 105 of FIGS. 1, 3-6, and 15-18. The light source arrays 120 and the light sensor arrays 125 may be disposed along edges 2105 of the display 105. A user may employ a pointer 1705 such as a finger, a knuckle, a stylus, or the like to touch the display 105 or gesture on the display 105. By activating one source/sensor pair time, the present embodiment can precisely determine the location of the pointer 1705 relatives to the display 105.

Embodiments of the present invention may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a light source array comprising a plurality of light sources, each light source of the light source array transmitting a light beam across a face of a display in response to being activated;
   a light sensor array comprising a plurality of light sensors intermixed in a linear array with the light sources of the light source array, each light sensor of the light sensor array detecting an intensity of each light beam transmitted across the face of the display in response to being activated;
   a mirror disposed across the display face opposite the light source array, the light sources of the light source array transmitting each light beam to the mirror across the display face, and the light sensors of the light sensor array detecting the light beams reflected from the mirror across the display face; and
   a controller concurrently activating each light source of the light source array with each light sensor of the light sensor array as a source/sensor pair during a detection cycle while other light sources of the light source array and other light sensors of the light sensor array are inactive, and determining a location of a pointer relative to the display from a pattern of light beam intensities for each source/sensor pair.

2. The apparatus of claim 1, wherein the display comprises Liquid Crystal Display (LCD) pixels organized in a display grid, each light source comprises a LCD pixel fabricated with the display, wherein an area of each light source LCD pixel is greater than an area of each display grid LCD pixel, and a mirrored surface that reflects each light beam towards the light sensor array.

3. The apparatus of claim 2, each light source further comprising a lens focusing the light beam on the light sensor array.

4. The apparatus of claim 3, wherein each lens is a Fresnel lens.

5. The apparatus of claim 3, wherein the mirror surface and the lens are formed of a molded acrylic.

6. The apparatus of claim 1, wherein the light source array is organized as a two-dimensional m×n matrix, with m light source groups disposed along a first edge of the display, each light source group comprising n light sources and each of the n light sources transmitting a light beam at a different height relative to the display face, the light sensor array is organized as an m×n matrix, with m light sensor groups disposed along a second edge of the display, each light source group comprising n light sources and each of the n light sources detecting a light beam transmitted at a different height relative to the display face, and the controller determining a height of the pointer relative to the display from the light beam intensities.

7. The apparatus of claim 1, wherein a first light sensor array is disposed across the display face opposite a second light sensor array, and the light source array is disposed across the display face perpendicular to the first light sensor array and the second light sensor array.

8. The apparatus of claim 1, wherein the display comprises LCD pixels organized in a display grid, each light source of the light source array transmitting the light beam through a cavity disposed between substrate layers of the LCD pixels, and the light sensors detecting a distortion of the display by the pointer.

9. The apparatus of claim 1, wherein each light source is an Organic Light Emitting Diode.

10. The apparatus of claim 1, wherein the light source array comprises LCD pixels organized in a display grid, the light sensor array comprises light sensors fabricated with the LCD pixels and interspersed in the display grid and detecting interference patterns resulting from a distortion of the display by the pointer.

11. The apparatus of claim 1, wherein each light sensor is a camera and the controller calculates a stereo image of the pointer and determines the location of the pointer from the stereo image.

12. A method comprising:
providing a light source array comprising a plurality of light sources, each light source of the light source array transmitting a light beam across a face of a display in response to being activated;
providing a light sensor array comprising a plurality of light sensors intermixed in a linear array with the light sources of the light source array, each light sensor of the light sensor array detecting an intensity of each light beam transmitted across the face of the display in response to being activated;
providing a mirror disposed across the display face opposite the light source array, the light sources of the light source array transmitting each light beam to the mirror across the display face, and the light sensors of the light sensor array detecting the light beams reflected from the mirror across the display face;
concurrently activating each light source of the light source array with each light sensor of the light sensor array as a source/sensor pair during a detection cycle while other light sources of the light source array and other light sensors of the light sensor array are inactive; and
determining a location of a pointer relative to the display from a pattern of light beam intensities for each source/sensor pair.

13. The method of claim 12, wherein the display comprises LCD pixels organized in a display grid, each light source comprises a LCD pixel fabricated with the display, wherein an area of each light source LCD pixel is greater than an area of each display grid LCD pixel, and a mirrored surface that reflects each light beam towards the light sensor array.

14. The method of claim 12, wherein the light source array is organized as a two-dimensional m×n matrix, with m light source groups disposed along a first edge of the display, each light source group comprising n light sources and each of the n light sources transmitting a light beam at a different height relative to the display face, the light sensor array is organized as an m×n matrix, with m light sensor groups disposed along a second edge of the display, each light source group comprising n light sources and each of the n light sources detecting a light beam transmitted at a different height relative to the display face, and the controller determining a height of the pointer relative to the display from the light beam intensities.

15. A system comprising:
a display comprising LCD pixels organized in a display grid;
a light source array comprising a plurality of light sources each comprising a LCD pixel fabricated with the display, wherein an area of each light source LCD pixel is greater than an area of each display grid LCD pixel, each light source further comprising a first mirrored surface reflecting a light beam from the light source across a face of the display in response to the activation of the light source;
a light sensor array comprising a plurality of light sensors intermixed in a linear array with the light sources of the light source array, each light sensor of the light sensor array comprising a second mirrored surface reflecting each light beam to the light sensor and the light sensor detecting an intensity of each light beam reflected from the second mirrored surface in response to the activation of the light sensor;
a mirror disposed across the display face opposite the light source array, the light sources of the light source array transmitting each light beam to the mirror across the display face, and the light sensors of the light sensor array detecting the light beams reflected from the mirror across the display face; and
a controller concurrently activating each light source of the light source array with each light sensor of the light sensor array as a source/sensor pair during a detection cycle while other light sources of the light source array and other light sensors of the light sensor array are inactive, and determining a location of a pointer relative to the display from a pattern of light beam intensities for each source/sensor pair.

16. The system of claim 15, each light source further comprising a first lens focusing the light beam on the light sensor array and each light sensor comprising a second lens focusing the light bean on the light sensor.

17. The system of claim 16, wherein the light source array is organized as a two-dimensional m×n matrix, with m light source groups disposed along a first edge of the display, each light source group comprising n light sources and each of the n light sources transmitting a light beam at a different height relative to the display face, the light sensor array is organized as a two-dimensional m×n matrix, with m light sensor groups disposed along a second edge of the display, each light source group comprising n light sources and each of the n light sources detecting a light beam transmitted at a different height relative to the display face, and the controller determining a height of the pointer relative to the display from the light beam intensities.

* * * * *